(12) United States Patent
Vanni et al.

(10) Patent No.: US 11,121,605 B2
(45) Date of Patent: Sep. 14, 2021

(54) HYBRID MODULE WITH CLUTCH BALANCE CHAMBER

(71) Applicant: Schaeffler Technologies AG & Co. KG, Herzogenaurach (DE)

(72) Inventors: Jeremy Vanni, Wooster, OH (US); Matthew Payne, Glenmont, OH (US); John Ramsey, Mansfield, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 555 days.

(21) Appl. No.: 16/052,439

(22) Filed: Aug. 1, 2018

(65) Prior Publication Data

US 2019/0044410 A1 Feb. 7, 2019

Related U.S. Application Data

(60) Provisional application No. 62/541,811, filed on Aug. 7, 2017.

(51) Int. Cl.
*H02K 7/108* (2006.01)
*B60K 6/40* (2007.10)
(Continued)

(52) U.S. Cl.
CPC ............... *H02K 7/108* (2013.01); *B60K 6/40* (2013.01); *H02K 1/28* (2013.01); *H02K 1/32* (2013.01);
(Continued)

(58) Field of Classification Search
CPC ........... H02K 7/108; H02K 9/19; H02K 7/10; H02K 1/32; H02K 1/28; H02K 7/003;
(Continued)

(56) References Cited

U.S. PATENT DOCUMENTS

| 2005/0126874 | A1* | 6/2005 | Back | F16H 45/02 192/3.3 |
| 2013/0111891 | A1* | 5/2013 | Iwase | F02B 63/042 60/347 |

(Continued)

FOREIGN PATENT DOCUMENTS

JP 2007176286 A 7/2007

OTHER PUBLICATIONS

International Search Report for PCT/DE2018/044875; 11 pgs; dated Nov. 16, 2018 from the Korean Patent Dffice.

*Primary Examiner* — John K Kim
(74) *Attorney, Agent, or Firm* — Kevin L. Parks

(57) ABSTRACT

A hybrid module includes a motor housing, an electric motor, a shaft, a torque converter housing, a backing plate, a piston, and a hub. The motor housing includes a first flow passage. The electric motor includes a rotor and stator. The shaft is drivingly engaged with the rotor and includes a second flow passage arranged for fluid communication with the first flow passage. The torque converter housing is drivingly engaged with the rotor. The backing plate is fixed to the torque converter housing. The piston is sealed to the torque converter housing and the backing plate and forms at least a portion of a first fluid chamber and a second fluid chamber. The hub includes a third flow passage arranged for fluid communication with the second flow passage and one of the first fluid chamber or the second fluid chamber.

15 Claims, 7 Drawing Sheets

(51) Int. Cl.
*H02K 1/28* (2006.01)
*H02K 7/00* (2006.01)
*H02K 9/19* (2006.01)
*H02K 7/10* (2006.01)
*H02K 1/32* (2006.01)
*B60K 6/48* (2007.10)

(52) U.S. Cl.
CPC ............. *H02K 7/003* (2013.01); *H02K 7/006* (2013.01); *H02K 7/10* (2013.01); *H02K 9/19* (2013.01); *B60K 2006/4825* (2013.01)

(58) Field of Classification Search
CPC .. H02K 7/006; B60K 6/40; B60K 2006/4825; B60K 6/48; B60K 6/387; Y02T 10/62; F16D 25/12; F16D 25/0635
USPC .......................................................... 310/78
See application file for complete search history.

(56) References Cited

U.S. PATENT DOCUMENTS

| | | | |
|---|---|---|---|
| 2013/0192947 A1* | 8/2013 | Frait | B60K 6/48 192/3.32 |
| 2014/0262666 A1 | 9/2014 | Ushio et al. | |
| 2015/0114787 A1* | 4/2015 | Brevick | B60K 6/26 192/66.32 |
| 2015/0328974 A1 | 11/2015 | Okuda et al. | |
| 2015/0354671 A1* | 12/2015 | Schoenek | F16H 57/0484 475/5 |
| 2015/0362052 A1* | 12/2015 | Frait | F16H 61/0021 60/341 |
| 2016/0017971 A1 | 1/2016 | Sayre et al. | |
| 2016/0084363 A1 | 3/2016 | Steinberger et al. | |
| 2016/0105060 A1* | 4/2016 | Lindemann | H02K 1/27 701/22 |
| 2019/0044410 A1* | 2/2019 | Vanni | H02K 7/003 |

* cited by examiner

HYBRID MODULE WITH CLUTCH BALANCE CHAMBER

FIELD

The invention relates generally to a hybrid module, and more specifically to a hybrid module with a clutch balance chamber.

BACKGROUND

Hybrid modules are known. One example is shown in commonly assigned United States Published Application No. 2016/0105060 titled HYBRID DRIVE MODULE HAVING A ROTOR SECURED TO A HUB VIA STAKING to Lindemann et al., hereby incorporated by reference as if set for fully herein.

BRIEF SUMMARY

Example aspects broadly comprise a hybrid module including a motor housing, an electric motor, a shaft, a torque converter housing, a backing plate, a piston, and a hub. The motor housing includes a first flow passage. The electric motor includes a rotor and stator. The shaft is drivingly engaged with the rotor and includes a second flow passage arranged for fluid communication with the first flow passage. The torque converter housing is drivingly engaged with the rotor. The backing plate is fixed to the torque converter housing. The piston is sealed to the torque converter housing and the backing plate and forms at least a portion of a first fluid chamber and a second fluid chamber. The hub includes a third flow passage arranged for fluid communication with the second flow passage and one of the first fluid chamber or the second fluid chamber.

In an example embodiment, the hybrid module includes a seal for sealing the hub to the shaft. In an example embodiment, the shaft and the hub are integrally formed from a single piece of material. In some example embodiments, the first fluid chamber is at least partially formed by the torque converter housing and the second fluid chamber is at least partially formed by the backing plate. In an example embodiment, the third flow passage is arranged for fluid communication with the second fluid chamber. In some example embodiments, the hub includes a fourth flow passage. In some example embodiments, the fourth flow passage is arranged for fluid communication with the second fluid chamber. In an example embodiment, the hub includes a fifth flow passage in fluid communication with the fourth flow passage.

Other example aspects broadly comprise a hybrid module including a motor housing, an electric motor, a shaft, a torque converter housing, a backing plate and a piston. The motor housing includes a first flow passage. The electric motor includes a rotor and stator. The shaft is drivingly engaged with the rotor and includes a second flow passage arranged for fluid communication with the first flow passage. The torque converter housing is drivingly engaged with the rotor. The piston is piston is sealed to the torque converter housing, the backing plate, and the shaft, and forms at least a portion of a first fluid chamber and a second fluid chamber.

In an example embodiment, the torque converter housing is sealed to the shaft. In an example embodiment, the hybrid module includes a sealing plate fixed to the shaft. The torque converter housing is sealed to the sealing plate. In an example embodiment, the hybrid module includes a seal for sealing the housing to the shaft. In an example embodiment, the first fluid chamber is at least partially formed by the torque converter housing and the second fluid chamber is at least partially formed by the backing plate. In an example embodiment, the second flow passage is arranged for fluid communication with the first fluid chamber. In an example embodiment, the hybrid module includes a third flow passage for cooling the electric motor arranged for fluid communication with the first flow chamber.

BRIEF DESCRIPTION OF THE DRAWINGS

The nature and mode of operation of the present invention will now be more fully described in the following detailed description taken with the accompanying drawing figures, in which.

DETAILED DESCRIPTION

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described.

Figure 1:
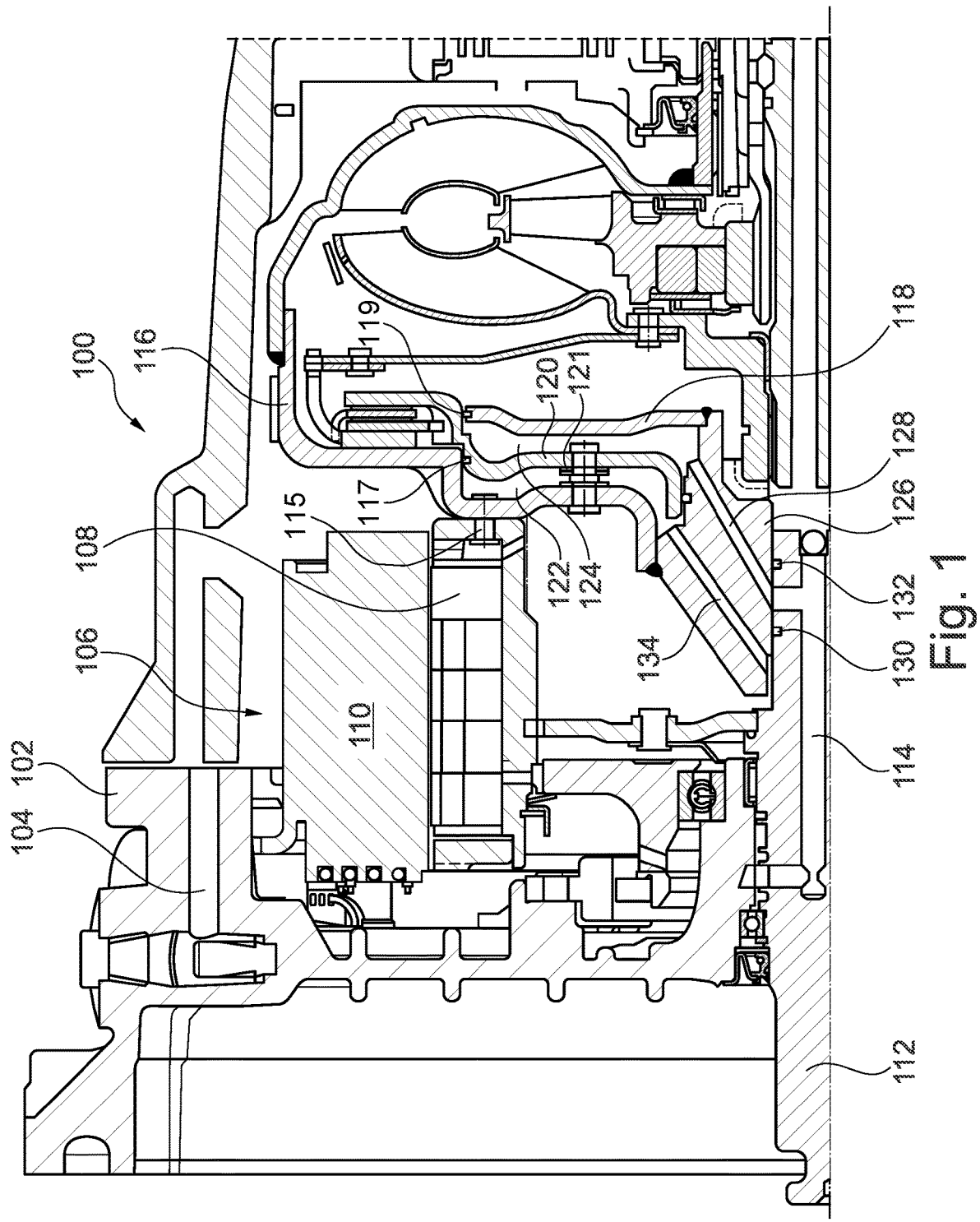
FIG. 1 is a section view of an example embodiment of a hybrid module.
Figure 2:
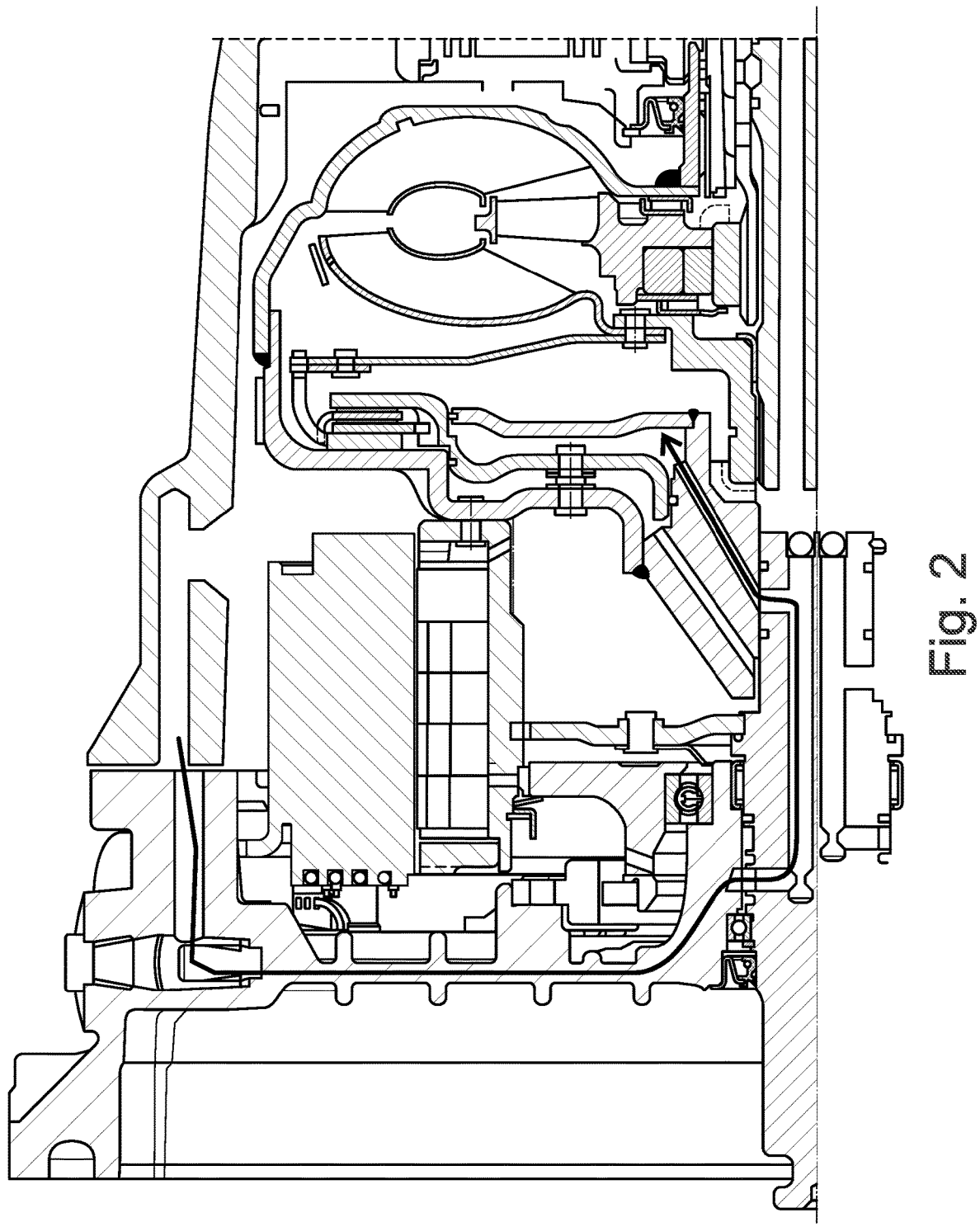
FIG. 2 is the section view of FIG. 1 with an arrow indicating a flow passage.
Figure 3:
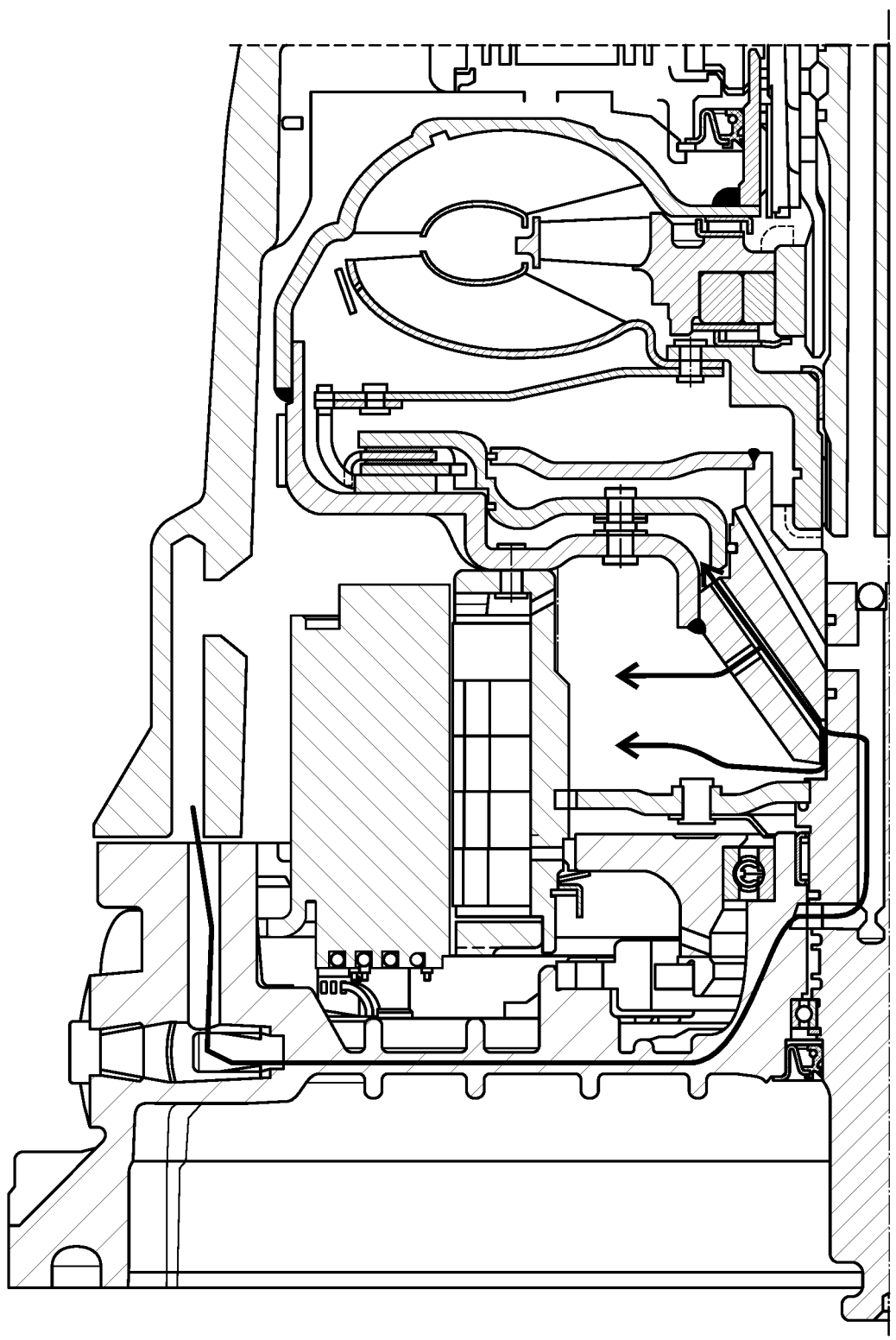
FIG. 3 is the section view of FIG. 1 with an arrow indicating a flow passage.

The following description is made with reference to FIGS. 1-3. FIG. 1 is a section view of an example embodiment of a hybrid module. FIG. 2 is the section view of FIG. 1 with an arrow indicating a flow passage. FIG. 3 is the section view of FIG. 1 with an arrow indicating a flow passage. Hybrid module 100 includes motor housing 102 with flow passage 104. Electric motor 106 includes rotor 108 and stator 110. Shaft 112 is drivingly engaged with the rotor and includes flow passage 114 arranged for fluid communication with flow passage 104. That is, a bulkhead of housing 102 includes a flow passage (not shown) extending radially inward from flow passage 104 to fluidically connect passages 104 and 114.

Torque converter housing 116 is non-rotatably connected to the rotor by rivet 115, for example. Backing plate 118 is fixed to the torque converter housing. Piston 120 is sealed to the torque converter housing at seal 117, for example, and to the backing plate at seal 119, for example. Piston 120 may be drivingly engaged with the housing by leaf spring 121, for example. The piston forms at least a portion of fluid chamber 122 and fluid chamber 124. Hub 126 is fixed to housing 116 and includes flow passage 128 arranged for fluid communication with flow passage 114 and fluid chamber 124. Although flow passage 128 is shown arranged for fluid communication with fluid chamber 124, other embodiments (not shown) may have flow passage 128 arranged for fluid communication with fluid chamber 122.

Fluid chamber 122 provides a balancing for piston 120. That is, during rotation of housing 116 by rotor 108 or an internal combustion engine (not shown), dynamic pressure in chambers 122 and 124 is equalized so that piston 120 is more easily controlled by pressure changes in chamber 124. In other words, a dynamic oil pressure effect on piston 120 is lessened or eliminated by chambers 122 and 124. This effect is further improved by a substantially same radial location of seals for sealing the piston to the housing, and the backing plate to the piston.

Module 100 includes seals 130 and 132 for sealing the hub to the shaft. Fluid chamber 122 is at least partially formed by the torque converter housing and fluid chamber 124 is at least partially formed by the backing plate. Hub 126 includes flow passage 134 arranged for fluid communication with fluid chamber 122. Oil in chamber 122 received via passage 134 assures the piston balancing described above. Torque converter housing 116, backing plate 118, and/or piston 120 may include an axial hole or a deliberate seal leak to expel trapped air and assure a complete filling of chamber 122 and/or chamber 124. Hub 126 may include flow passage 136 in fluid communication with flow passage 134 for providing a cooling flow to the electric motor.

Figure 4:
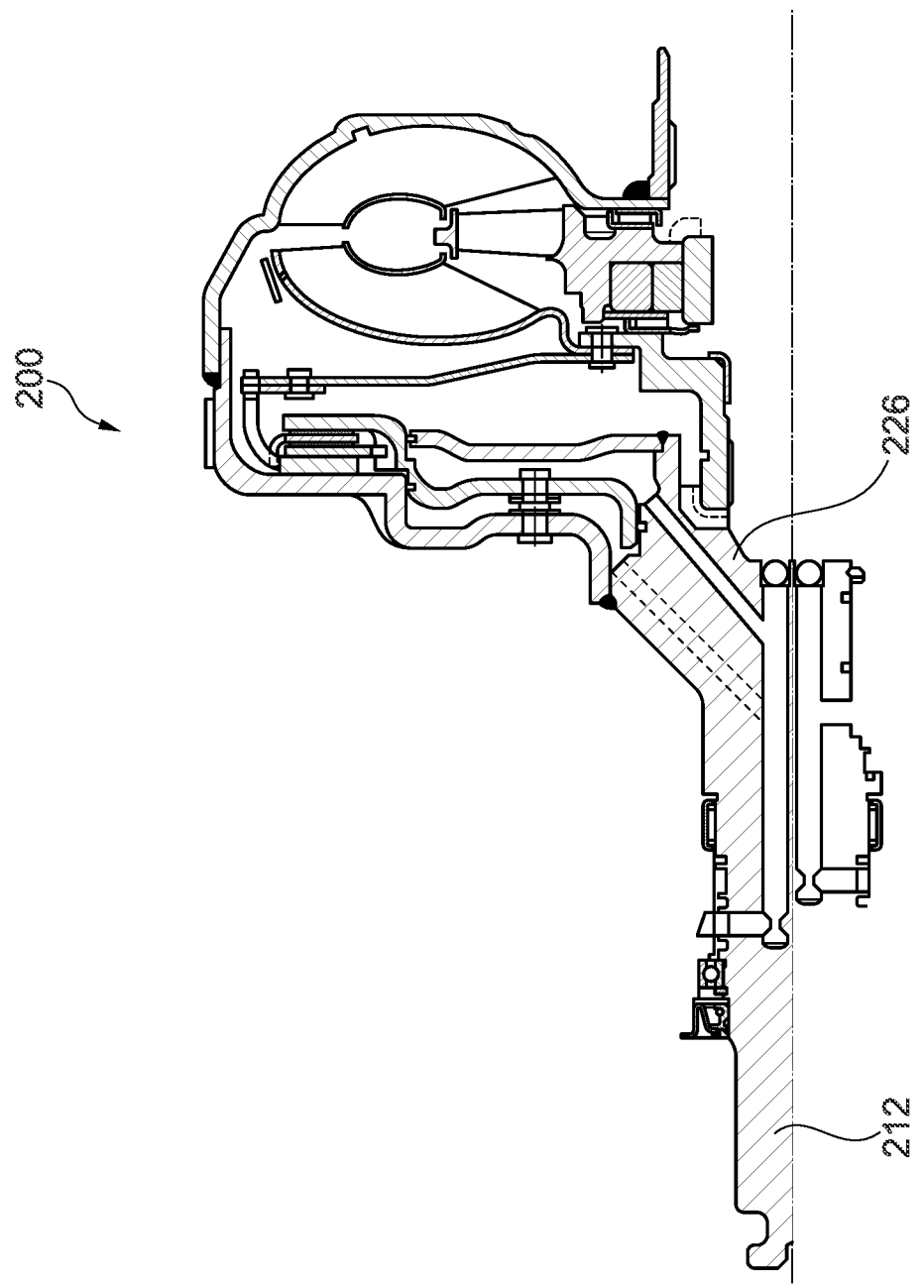
FIG. 4 is a cross section view of an alternative embodiment of the hybrid module of FIG. 1 with an electric motor and motor housing not shown for clarity.

The following description is made with reference to FIG. 4. FIG. 4 is a cross section view of an alternative embodiment of the hybrid module of FIG. 1 with an electric motor and motor housing not shown for clarity. All 2XX labels generally correspond to 1XX labels in FIG. 1 except where noted below. Hybrid module 200 includes shaft 212 and hub 226 integrally formed from a single piece of material.

Figure 5:
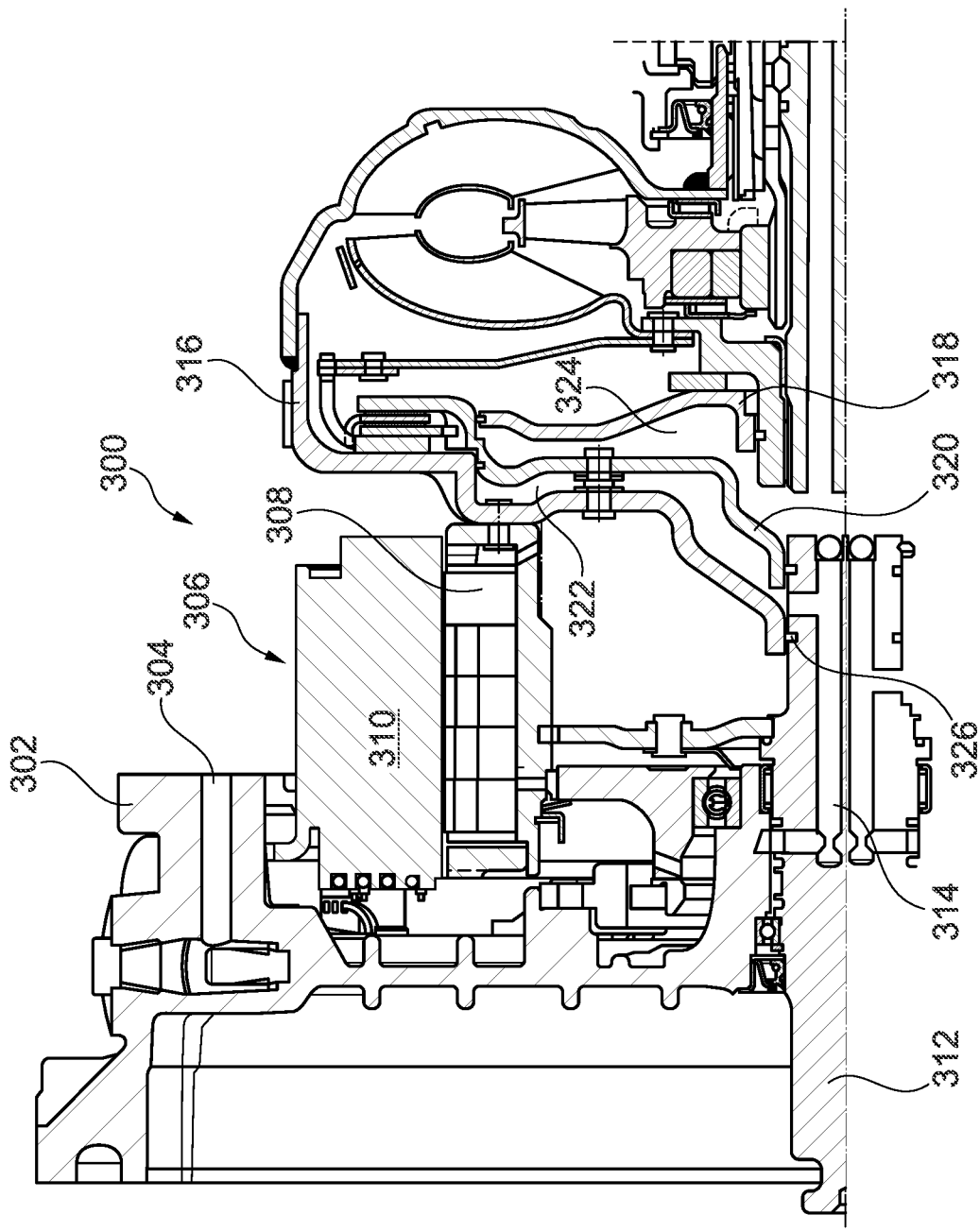
FIG. 5 is a cross section view of an example embodiment of a hybrid module.

The following description is made with reference to FIG. 5. FIG. 5 is a cross section view of an example embodiment of a hybrid module. Hybrid module 300 includes motor housing 302 with flow passage 304. Electric motor 306 includes rotor 308 and stator 310. Shaft 312 is drivingly engaged with the rotor and includes flow passage 314 arranged for fluid communication with flow passage 304. Torque converter housing 316 is drivingly engaged with the rotor. Module 300 includes backing plate 318 and piston 320 sealed to the torque converter housing, the backing plate, and the shaft. Piston 320 forms at least a portion of a fluid chambers 322 and 324.

Housing 316 is sealed to shaft 312 by seal 326, for example. Fluid chamber 322 is at least partially formed by the torque converter housing and fluid chamber 324 is at least partially formed by the backing plate. Flow passage 314 is arranged for fluid communication with fluid chamber 322.

Figure 6:
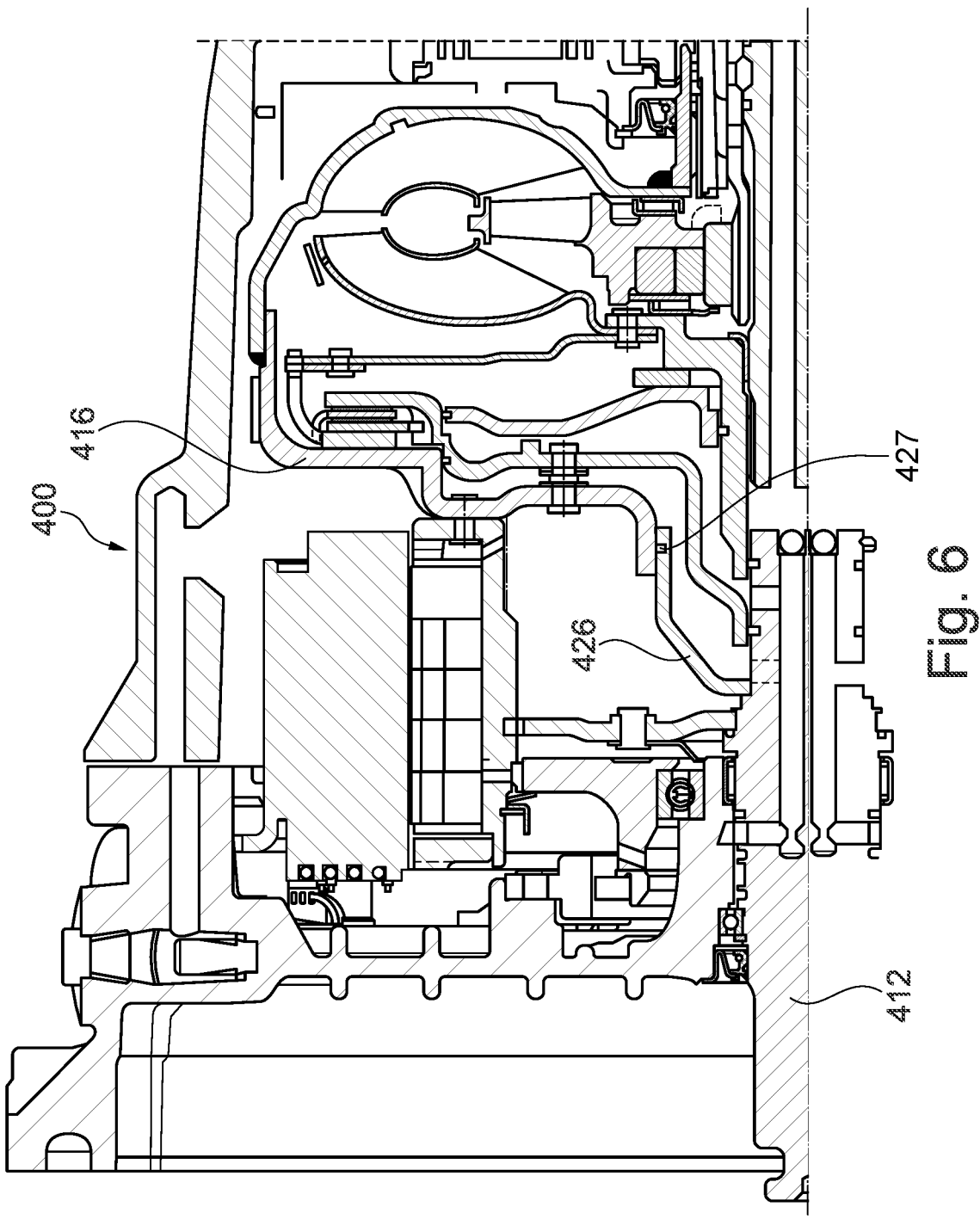
FIG. 6 is a cross section view of an alternative embodiment of the hybrid module of FIG. 5; and, FIG. 7 is cross section view of an alternative embodiment of the hybrid module of FIG. 5.

The following description is made with reference to FIG. 6. FIG. 6 is a cross section view of an alternative embodiment of the hybrid module of FIG. 5. All 4XX labels generally correspond to 3XX labels except where noted below. Hybrid module 400 includes sealing plate 426 fixed to shaft 412. Torque converter housing 416 is sealed to the sealing plate by seal 427, for example.

Figure 7:
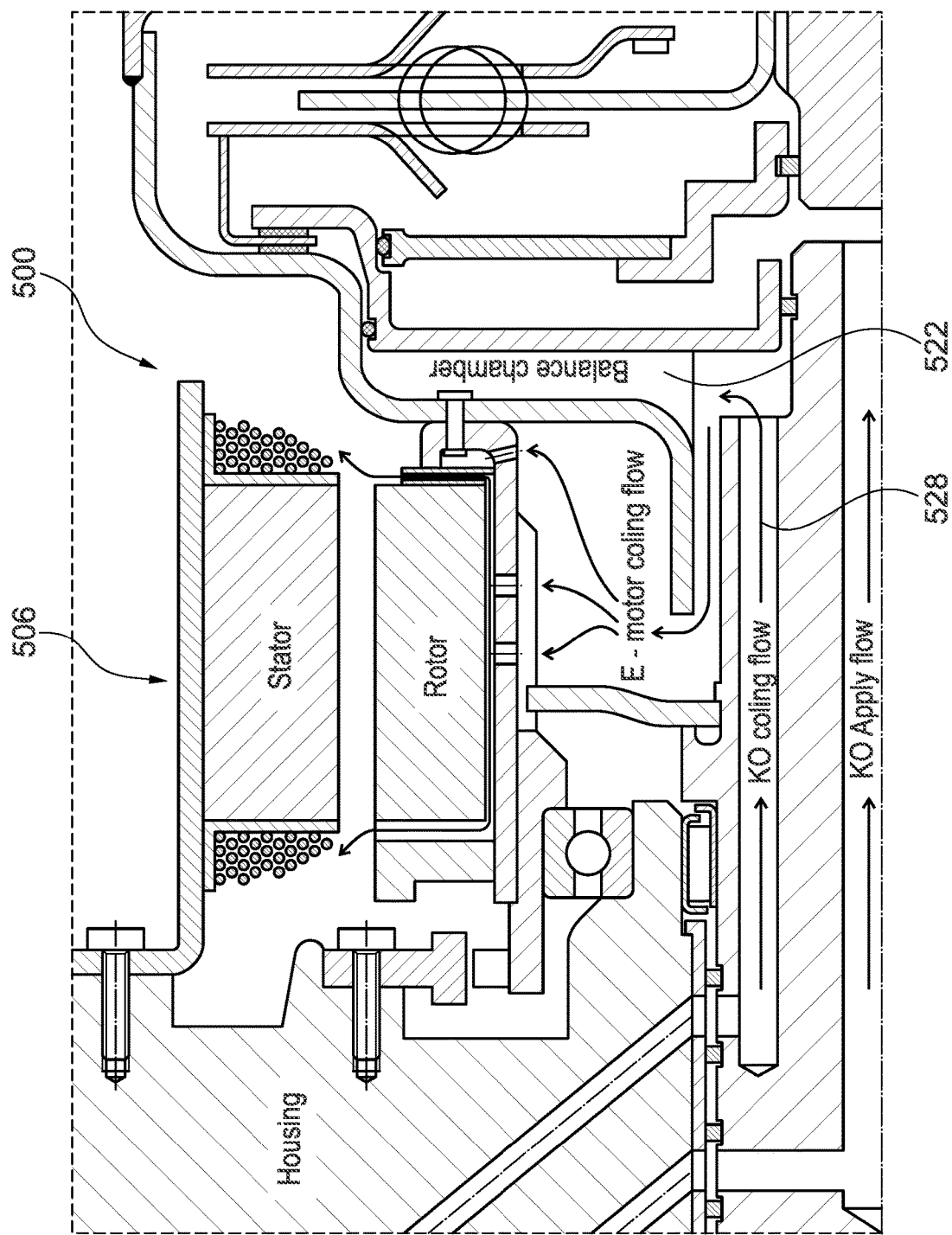

The following description is made with reference to FIG. 7. FIG. 7 is a cross section view of an alternative embodiment of the hybrid module of FIG. 5. All 5XX labels generally correspond to 3XX labels except where noted below. Hybrid module 500 includes flow passage 528 for cooling the electric motor arranged for fluid communication with the fluid chamber 522.

Of course, changes and modifications to the above examples of the invention should be readily apparent to those having ordinary skill in the art, without departing from the spirit or scope of the invention as claimed. Although the invention is described by reference to specific preferred and/or example embodiments, it is clear that variations can be made without departing from the scope or spirit of the invention as claimed.

LIST OF REFERENCE NUMERALS

100 Hybrid module
102 Motor housing
104 Flow passage
106 Electric motor
108 Rotor
110 Stator
112 Shaft
114 Flow passage
115 Rivet
116 Torque converter housing
117 Seal
118 Backing plate
119 Seal
120 Piston
122 Fluid chamber
124 Fluid chamber
126 Hub
128 Flow passage
130 Seal
132 Seal
134 Flow passage
136 Flow passage
200 Hybrid module
212 Shaft
226 Hub
300 Hybrid module
302 Motor housing
304 Flow passage
306 Electric motor
308 Rotor
310 Stator
312 Shaft
314 Flow passage
316 Torque converter housing
318 Backing plate
320 Piston
322 Fluid chamber
324 Fluid chamber
326 Seal
400 Hybrid module
412 Shaft
416 Torque converter housing
426 Sealing plate
427 Seal
500 Hybrid module
522 Fluid chamber
528 Flow passage

What we claim is:

1. A hybrid module comprising:
   a motor housing including a first flow passage;
   an electric motor including a rotor and stator;
   a shaft drivingly engaged with the rotor and including a second flow passage arranged for fluid communication with the first flow passage;
   a torque converter housing non-rotatably connected to the rotor;
   a backing plate fixed to the torque converter housing;
   a piston sealed to the torque converter housing and the backing plate and forming at least a portion of a first fluid chamber and a second fluid chamber; and,
   a hub including a third flow passage arranged for fluid communication with the second flow passage and one of the first fluid chamber or the second fluid chamber.

2. The hybrid module of claim 1 further comprising a seal for sealing the hub to the shaft.

3. The hybrid module of claim 1 wherein the shaft and the hub are integrally formed from a single piece of material.

4. The hybrid module of claim 1 wherein the first fluid chamber is at least partially formed by the torque converter housing and the second fluid chamber is at least partially formed by the backing plate.

5. The hybrid module of claim 4 wherein the third flow passage is arranged for fluid communication with the second fluid chamber.

6. The hybrid module of claim 4 wherein the hub comprises a fourth flow passage.

7. The hybrid module of claim 6 wherein the fourth flow passage is arranged for fluid communication with the second fluid chamber.

8. The hybrid module of claim 7 wherein the hub includes a fifth flow passage in fluid communication with the fourth flow passage.

9. A hybrid module comprising:
   a motor housing including a first flow passage;
   an electric motor including a rotor and stator;
   a shaft drivingly engaged with the rotor and including a second flow passage arranged for fluid communication with the first flow passage;
   a torque converter housing non-rotatably connected to the rotor;
   a backing plate; and,
   a piston sealed to the torque converter housing, the backing plate, and the shaft, and forming at least a portion of a first fluid chamber and a second fluid chamber.

10. The hybrid module of claim 9 wherein the torque converter housing is sealed to the shaft.

11. The hybrid module of claim 9 further comprising a sealing plate fixed to the shaft wherein the torque converter housing is sealed to the sealing plate.

12. The hybrid module of claim 9 further comprising a seal for sealing the housing to the shaft.

13. The hybrid module of claim 9 wherein the first fluid chamber is at least partially formed by the torque converter housing and the second fluid chamber is at least partially formed by the backing plate.

14. The hybrid module of claim 9 wherein the second flow passage is arranged for fluid communication with the first fluid chamber.

15. The hybrid module of claim 9 further comprising a third flow passage for cooling the electric motor arranged for fluid communication with the first flow chamber.

* * * * *